United States Patent
Tobisu et al.

(10) Patent No.: US 11,728,861 B2
(45) Date of Patent: Aug. 15, 2023

(54) WIRELESS COMMUNICATION DEVICE THAT IMPLEMENTS BEAMFORMING

(71) Applicant: FUJITSU LIMITED, Kawasaki (JP)

(72) Inventors: Yusuke Tobisu, Yokohama (JP); Kohei Ohta, Kawasaki (JP); Satoshi Matsubara, Kawasaki (JP); Akihiko Komatsuzaki, Kawasaki (JP); Hisato Kawano, Kawasaki (JP); Hideyuki Kannari, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/477,672

(22) Filed: Sep. 17, 2021

(65) Prior Publication Data

US 2022/0247462 A1    Aug. 4, 2022

(30) Foreign Application Priority Data

Jan. 29, 2021 (JP) ................. 2021-012750

(51) Int. Cl.
*H04B 7/06* (2006.01)
*H04B 15/00* (2006.01)

(52) U.S. Cl.
CPC ........... *H04B 7/0617* (2013.01); *H04B 15/00* (2013.01)

(58) Field of Classification Search
CPC .................................................. H04B 7/0617
USPC ........................................................ 375/267
See application file for complete search history.

(56) References Cited

U.S. PATENT DOCUMENTS

2009/0296663 A1* 12/2009 Wild ................. H01Q 1/246
                                                                370/335
2018/0026683 A1    1/2018 Manholm et al.

FOREIGN PATENT DOCUMENTS

JP    2017-79434 A    4/2017
JP    2018-512780 A   5/2018

* cited by examiner

*Primary Examiner* — Lihong Yu
(74) *Attorney, Agent, or Firm* — Myers Wolin, LLC

(57) ABSTRACT

A wireless communication device that implements beamforming includes: a storage, a processor, and a radio circuit. The storage stores directivity information that indicates a directivity of a radio intensity obtained when beams are formed in a plurality of main lobe directions designated in advance. The processor calculates, based on the directivity information, an interference to a first beam from a second beam when an instruction to form the first beam and the second beam is given. The first beam is configured to transmit a first signal in a first main lobe direction. The second beam is configured to transmit a second signal in a second main lobe direction. The processor generates, based on the calculated interference, a cancellation signal for canceling the second signal in the first main lobe direction. The radio circuit transmits the first signal and the cancellation signal.

3 Claims, 17 Drawing Sheets

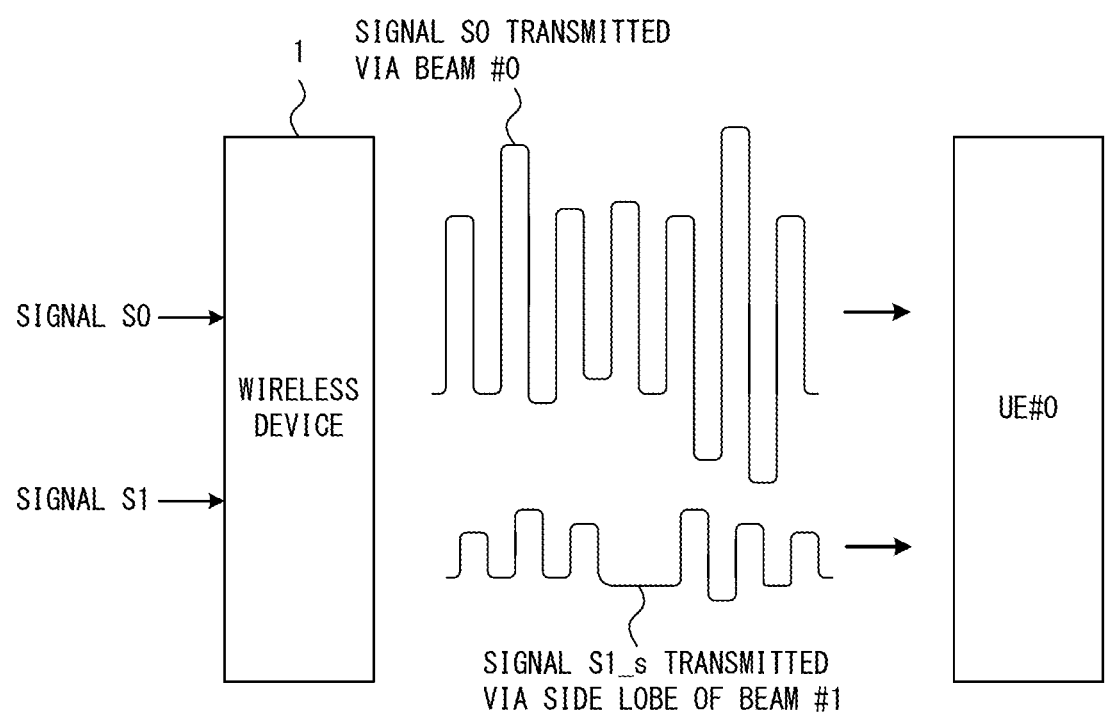
F I G. 2

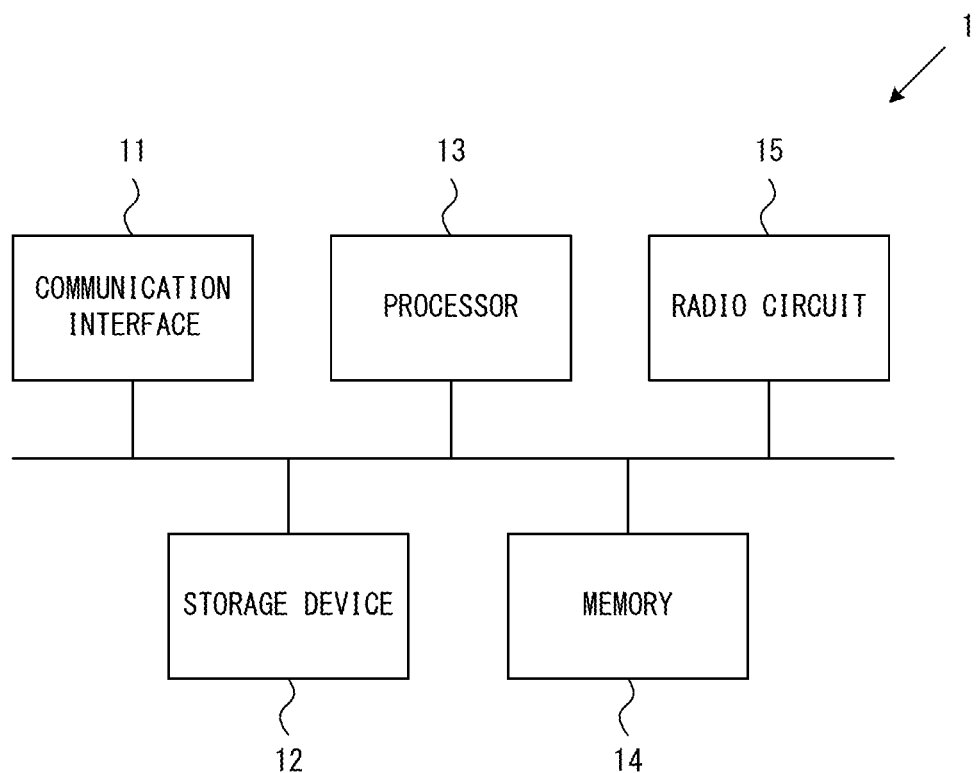
F I G. 3

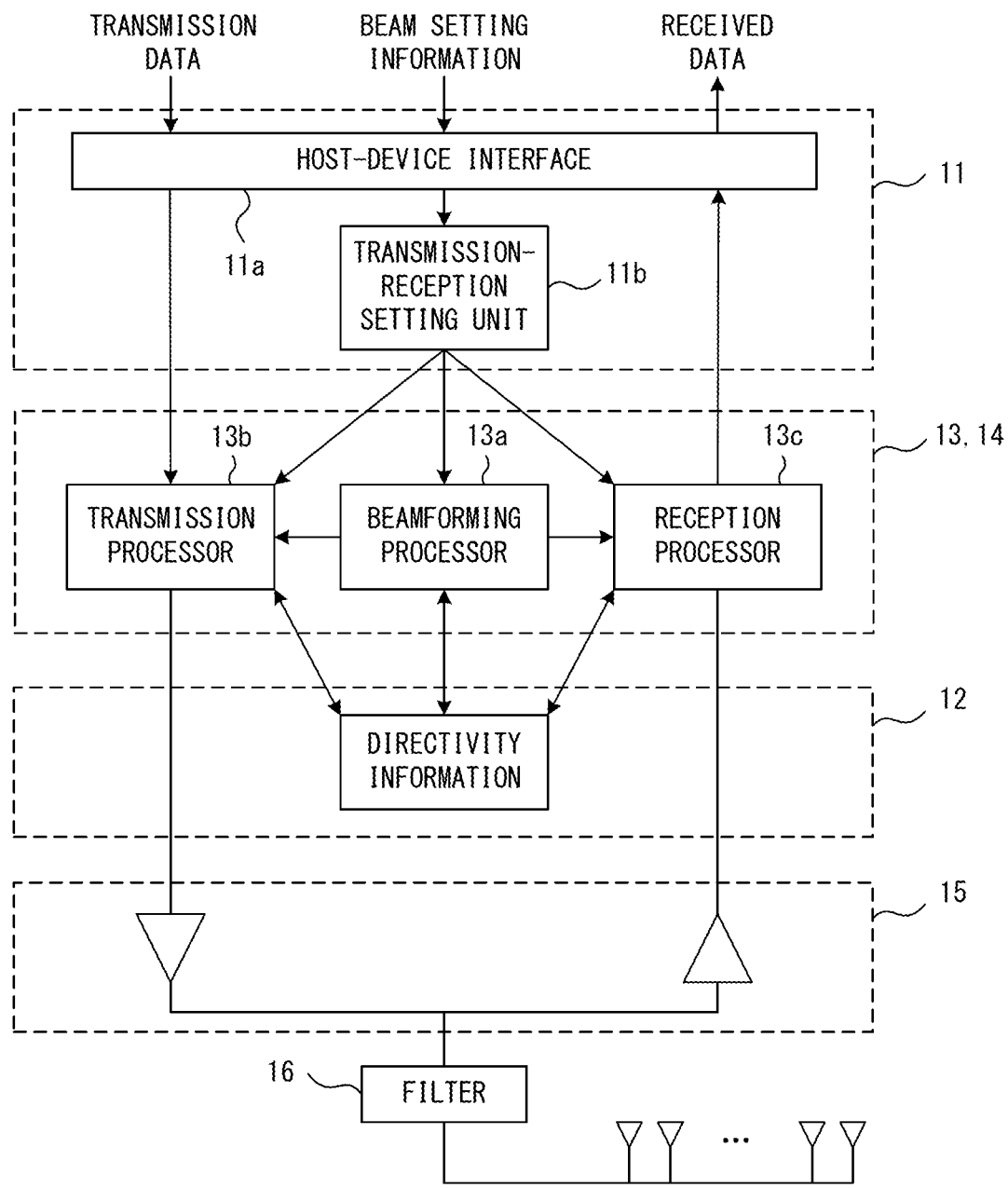
F I G. 4

|        | ID1     | ID2     | ID3     | · · · |
|--------|---------|---------|---------|-------|
| Port #0 | $\theta\_01$ | $\theta\_02$ | $\theta\_03$ |       |
| Port #1 | $\theta\_11$ | $\theta\_12$ | $\theta\_13$ |       |
| Port #2 | $\theta\_21$ | $\theta\_22$ | $\theta\_23$ |       |
| Port #3 | $\theta\_31$ | $\theta\_32$ | $\theta\_33$ |       |

F I G. 8

| | INTERFERENCE BEAM → | | DESIRED BEAM → | | | | |
|---|---|---|---|---|---|---|---|
| ANGLE | ID1 | ID2 | ID3 | ID4 | ID5 | ID6 | ... |
| -60 | -3.9 | -24.6 | -21.7 | -25.5 | -30.5 | -37.7 | |
| -55 | -1.1 | -12.1 | -18.5 | -27.7 | -42.9 | -34.1 | |
| -50 | 0.0 | -5.3 | -20.9 | -35.7 | -26.9 | -24.9 | |
| -45 | -1.5 | -1.4 | -22.0 | 19.1 | -20.9 | -23.0 | |
| -40 | -8.1 | 0.0 | -7.6 | -15.5 | 22.7 | -31.9 | |
| -35 | -17.1 | -1.8 | -1.8 | -25.2 | -27.7 | -23.2 | |
| -30 | -8.3 | -10.0 | 0.0 | -10.3 | -14.9 | -18.5 | |
| -25 | -15.2 | -15.1 | -2.2 | -2.2 | -16.9 | -32.9 | |
| -20 | -13.3 | -10.6 | -12.6 | 0.0 | -13.4 | -15.6 | |
| -15 | -10.8 | -31.0 | -13.8 | -2.6 | -2.6 | -14.5 | |
| -10 | -29.6 | -13.0 | -13.2 | -15.0 | 0.0 | -15.5 | |
| -5 | -11.2 | -17.6 | -25.3 | -13.5 | -2.7 | -2.8 | |
| 0 | -21.0 | -17.9 | -14.4 | -15.6 | -15.7 | 0.0 | |
| ... | | | | | | | |
| 50 | -2.7 | -21.9 | -26.0 | -23.1 | -24.0 | -25.5 | |
| 55 | -1.9 | -22.3 | -20.2 | -23.6 | -28.6 | -35.9 | |
| 60 | -3.2 | -14.2 | -20.8 | -29.3 | -46.3 | -37.5 | |

FIG. 10

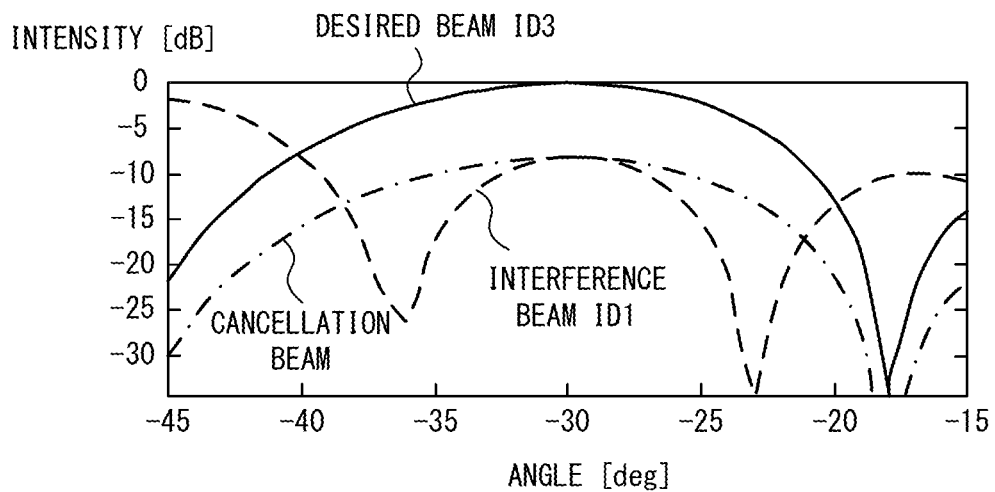
F I G. 1 3 A
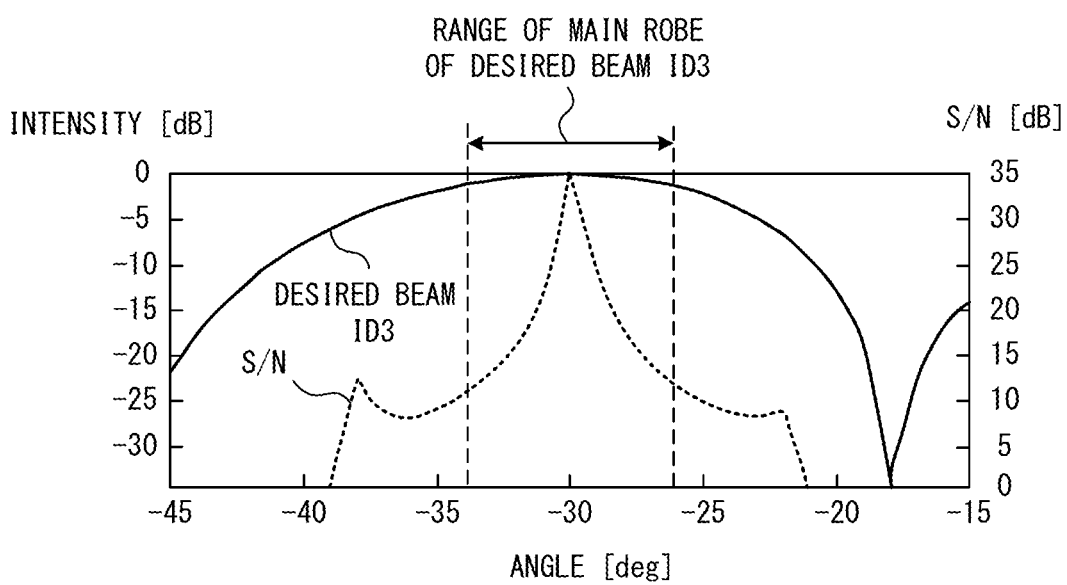
F I G. 1 3 B

WIRELESS COMMUNICATION DEVICE THAT IMPLEMENTS BEAMFORMING

CROSS-REFERENCE TO RELATED APPLICATION

This application is based upon and claims the benefit of priority under 35 U.S.C. 119 of the prior Japanese Patent Application No. 2021-012750, filed on Jan. 29, 2021, the entire contents of which are incorporated herein by reference.

FIELD

The embodiments discussed herein are related to a wireless communication device that implements beamforming.

BACKGROUND

In recent years, beamforming has been put into practical use as one technique for realizing the multiplexing of wireless communications or for realizing accurate sensing (radar). A wireless communication device that implements beamforming includes a plurality of antenna elements arranged in an array. A wireless communication device that implements beamforming may hereinafter be referred to as a "beamforming wireless device."

The beamforming wireless device forms beams for respective terminals by using the plurality of antenna elements. For example, the beamforming wireless device may control the direction of a transmission beam by controlling the phase and/or amplitude of signals transmitted via each antenna element in accordance with the position of the terminal. The beamforming wireless device may also control the direction of a reception beam by controlling the phase and/or amplitude of signals received via each antenna element in accordance with the position of the terminal.

However, a side lobe is formed when a desired beam (transmission/reception beam) is formed toward a target terminal. The side lobe is formed in a different direction from the main lobe of the desired beam. The side lobe may work as an interfering beam for another terminal. Thus, techniques for suppressing interference caused by side lobes have been proposed.

For example, a proposed antenna device detects an incoming wave from a correspondent node and directions, intensities and numbers of other incoming waves, and performs processing for suppressing side lobes according to the detected information (e.g., Japanese Laid-open Patent Publication No. 2017-079434). Methods for adapting a beam pattern have also been proposed (e.g., Japanese National Publication of International Patent Application No. 2018-512780).

In the prior art (e.g., the technique described in Japanese Laid-open Patent Publication No. 2017-079434), processing for suppressing a side lobe is performed according to received power. Thus, the time extending from detection of interference to suppression of the side lobe will be long. Hence, a side lobe may not be appropriately suppressed in a wireless communication system in which a beam needs to be changed at a fast rate. For example, in 5G communication, a beam may need to be changed on a symbol-by-symbol basis. In this case, the quality of wireless communication will decrease if a side lobe is not appropriately suppressed.

SUMMARY

According to an aspect of the embodiments, a wireless communication device that implements beamforming includes: a storage configured to store directivity information that indicates a directivity of a radio intensity obtained when beams are formed in a plurality of main lobe directions designated in advance; a processor configured to calculate, based on the directivity information, an interference to a first beam from a second beam when an instruction to form the first beam and the second beam is given, the first beam being for transmitting a first signal in a first main lobe direction, the second beam being for transmitting a second signal in a second main lobe direction, and generate, based on the calculated interference, a cancellation signal for canceling the second signal in the first main lobe direction, and a radio circuit configured to transmit the first signal and the cancellation signal.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 illustrates an example of interference between a desired beam and a side lobe of another beam;

FIG. 3 illustrates an example of the hardware configuration of a beamforming wireless device;

FIG. 4 illustrates an example of the function of a beamforming wireless device;

FIG. 8 illustrates an example of a phase table;

FIG. 10 illustrates an example of directivity information stored in a beam table;

FIGS. 13A and 13B illustrate an example of the state of radio waves in a case where a cancellation signal is transmitted;

DESCRIPTION OF EMBODIMENTS

Figure 1:
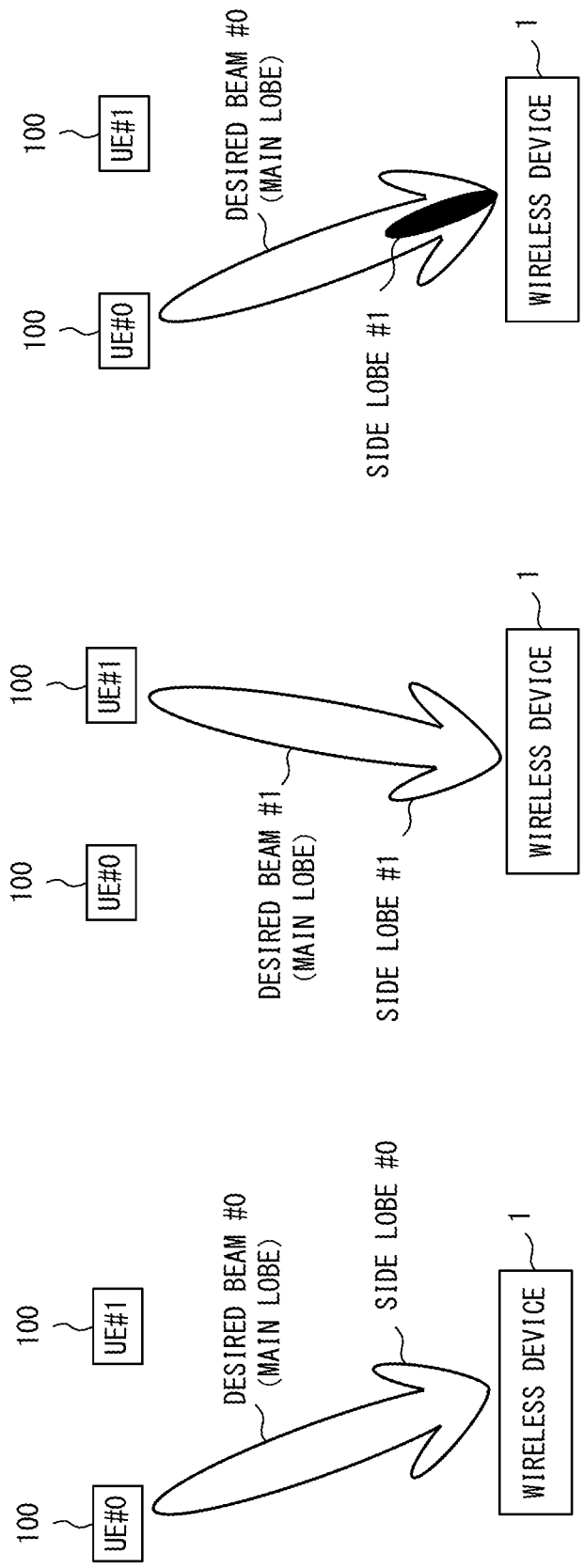
FIGS. 1A-1C illustrate an example of a wireless communication system in accordance with embodiments of the present invention.

FIGS. 1A-1C illustrate an example of a wireless communication system in accordance with embodiments of the present invention. In this example, the wireless communication system includes a beamforming wireless device 1 and a plurality of terminals 100.

For example, the beamforming wireless device 1 may be a base station device or an access point and can communicate with the plurality of terminals 100. The beamforming wireless device 1 includes a directional antenna including a plurality of antenna elements and can form beams (a transmission beam and a reception beam) for each of the terminals 100.

For example, the terminal 100 may be user equipment (UE) and can communicate with the beamforming wireless device 1. In the example depicted in FIGS. 1A-1C, two terminals 100 are located in a communication area covered by the beamforming wireless device 1. The two terminals 100 may hereinafter be referred to as "UE #1" and "UE #2."

When transmitting a signal to UE #0, the beamforming wireless device 1 forms a desired beam #0, as depicted in FIG. 1A. However, when the beam is formed, a side lobe will emerge in a different direction from the main lobe. The intensity of the side lobe is lower than that of the main lobe. A side lobe of the desired beam #0 may hereinafter be referred to as the "side lobe #0."

Likewise, when transmitting a signal to UE #1, the beamforming wireless device 1 forms a desired beam #1, as depicted in FIG. 1B. Also in this case, a side lobe emerges in a different direction from the main lobe. A side lobe of the desired beam #1 may hereinafter be referred to as the "side lobe #1."

When the beamforming wireless device 1 transmits signals to UE #0 and UE #1, the desired beam #0 depicted in FIG. 1A and the desired beam #1 depicted in FIG. 1B are formed. In this case, a side lobe emerges for each of the desired beams. Hence, a desired beam formed for either of the terminals 100 and a side lobe of the other desired beam may interfere with each other. In this example, as depicted in FIG. 1C, the side lobe #1 of the desired beam #1 for transmitting a signal to UE #1 interferes with the desired beam #0 for transmitting a signal to UE #0. In this case, UE #0 may receive a signal with reduced quality. In FIG. 1C, the side lobe #1 is represented in black. The main lobe of the desired beam #1 for transmitting a signal to UE #1 is omitted in FIG. 1C for visibility.

FIG. 2 illustrates an example of interference between a desired beam and a side lobe of another beam. This example indicates a signal traveling from the beamforming wireless device 1 to UE #0 in the case depicted in FIG. 1C. A signal S0 to be transmitted to UE #0 and a signal S1 to be transmitted to UE #1 are supplied to the beamforming wireless device 1.

In this case, the beamforming wireless device 1 forms the beam #0 depicted in FIG. 1A so as to transmit the signal S0. The beamforming wireless device 1 forms the beam #1 depicted in FIG. 1B so as to transmit the signal S1. In this case, a side lobe of the beam #1 (i.e., side lobe #1) emerges. In this example, the side lobe #1 is directed toward UE #0, as depicted in FIG. 1C. In this case, the signal S1 propagates toward UE #0 via the side lobe #1. Note that the signal S1 transmitted via the side lobe #1 may hereinafter be referred to as "S1_s" or the "interference signal S1_s."

As depicted in FIG. 2, UE #0 receives the signal S0 and the signal S1_s. In this case, the signal S0 is a signal that UE #0 is supposed to receive, and the signal S1_s is a signal that UE #0 is not supposed to receive. Thus, the signal S1_s is an interference component for the signal S0. However, the signal S0 is propagated by the main lobe, while the signal S1_s is propagated by the side lobe. Thus, the power of the signal S1_s is smaller than that of the signal S0 at the UE #0.

The beamforming wireless device 1 has a function for suppressing the interference component. In the example depicted in FIG. 2, the beamforming wireless device 1 suppresses the signal S1_s that works as an interference component for the signal S0. In this case, the beamforming wireless device 1 generates a cancellation signal for canceling the signal S1_s. The cancellation signal is transmitted via the beam #0 together with the signal S0. Thus, the signal S1_s and the cancellation signal cancel each other, thereby suppressing the interference to the signal S0.

FIG. 3 illustrates an example of the hardware configuration of the beamforming wireless device 1. The beamforming wireless device 1 includes a communication interface 11, a storage device 12, a processor 13, a memory 14, and a radio circuit 15. The beamforming wireless device 1 may also include other circuits or devices that are not depicted in FIG. 3.

The communication interface 11 is connected to a host device and receives control information for forming a beam from the host device. Data to be transmitted from the beamforming wireless device 1 to a terminal 100 is supplied from an application to the communication interface 11. Data received by the beamforming wireless device 1 from the terminal 100 is forwarded to the application via the communication interface 11.

The storage device 12 stores a communication program describing the operation of the beamforming wireless device 1. The storage device 12 also stores directivity information and a phase table, both described hereinafter.

The processor 13 controls the operation of the beamforming wireless device 1 by executing the communication program stored in the storage device 12. In this case, the processor 13 communicates with the terminal device 100 by referring to the directivity information and the phase table. Note that the processor 13 also performs the process of forming a beam. The memory 14 is used as a work area for the processor 13.

The radio circuit 15 includes a radio transmitter and a radio receiver. The radio transmitter transmits a signal processed by the processor 13 to a target terminal. The radio receiver receives a signal transmitted from a terminal. The received signal is forwarded to the processor 13.

FIG. 4 illustrates an example of the function of the beamforming wireless device 1. The beamforming wireless device 1 is connected to a host device (not illustrated). The host device manages terminals accommodated by the beamforming wireless device and generates beam setting information for forming a beam corresponding to each terminal. The host device generates data to be transmitted to the terminals.

The communication interface 11 includes a host-device interface 11a and a transmission-reception setting unit 11b. The host-device interface 11a receives transmission data from the host device. The host-device interface 11a receives beam setting information from the host device. The beam setting information identifies beams allocated to the terminals. The transmission-reception setting unit 11b supplies the beam setting information received by the host-device interface 11a to the processor 13.

The storage device 12 stores directivity information. The directivity information indicates the directivities of beams generated by the beamforming wireless device 1. In particular, the directivity information indicates the directivities of radio intensities attained when beams are formed in a plurality of main lobe directions designated in advance. The storage device 12 stores a software program to be executed by the processor 13.

The processor 13 includes a beamforming processor 13a, a digital transmission processor 13b, and a digital reception processor 13c. The functions of the beamforming processor 13a, the digital transmission processor 13b, and the digital reception processor 13c are provided by the processor 13 executing the software program.

According to the beam setting information, the beamforming processor 13a generates transmission control information for forming a transmission beam. The transmission control information includes information for generating a corresponding cancellation signal. According to the beam setting information, the beamforming processor 13a also generates reception control information for forming a reception beam. The reception control information includes information for generating a corresponding interference component signal. Note that the transmission control information and the reception control information are generated using the directivity information stored in the storage device 12.

The digital transmission processor 13b generates a transmission signal from transmission data according to transmission control information. In this case, the transmission signal is generated in such a manner as to form a transmission beam. The transmission signal includes a cancellation signal. The transmission signal is amplified by the radio circuit 15, filtered by the filter 16, and then output via the antenna elements.

A received signal that has arrived at the antenna elements is filtered by the filter 16, amplified by the radio circuit 15, and then guided to the digital reception processor 13c. The digital reception processor 13c recovers received data from the received signal according to reception control information. In this case, the received signal is processed to form a reception beam. The digital reception processor 13c removes an interference component from the received signal. The recovered data is sent to the host device (not illustrated) via the host-device interface 11a.

Figure 5:
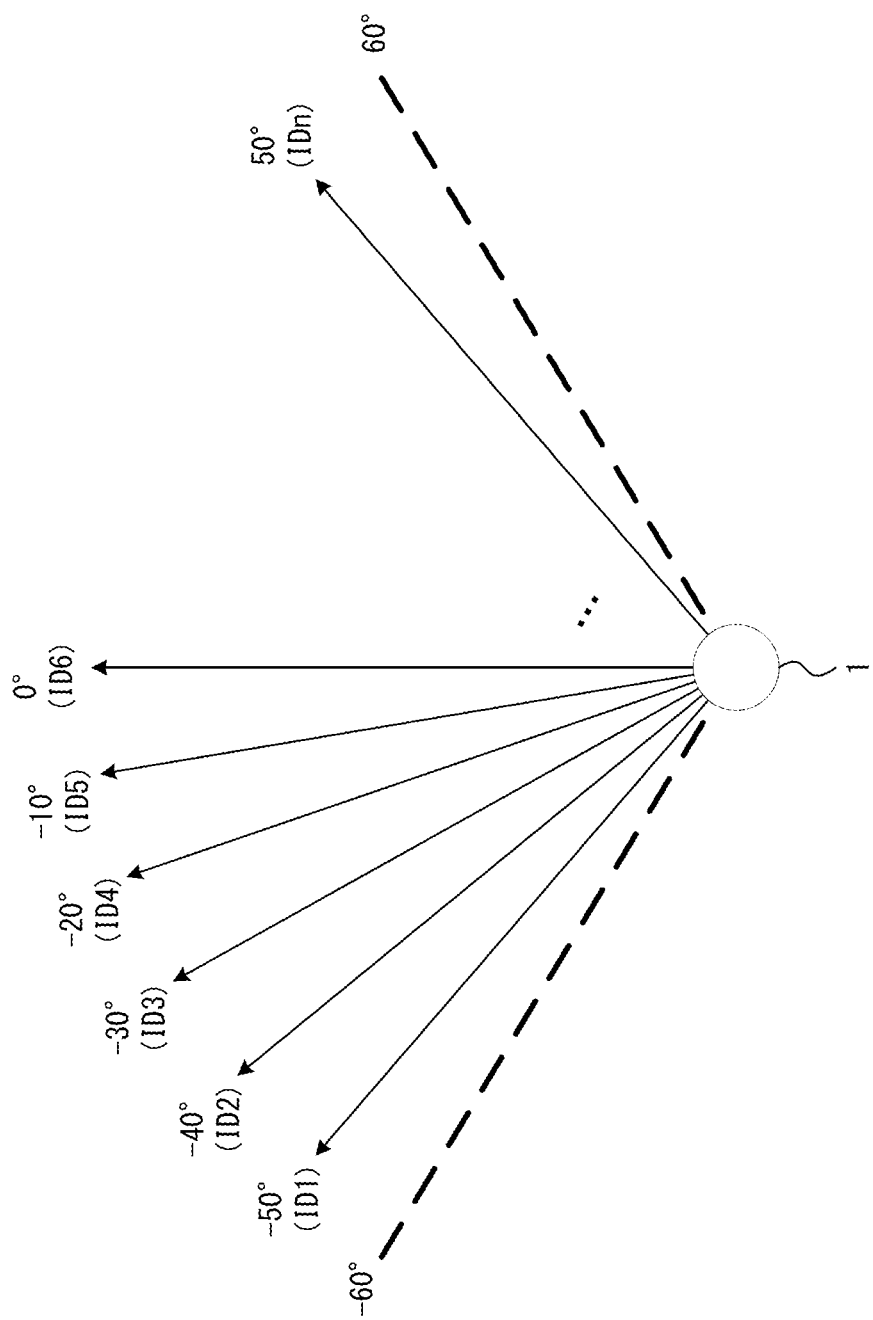
FIG. 5 illustrates an example of beams that a beamforming wireless device can form.

FIG. 5 illustrates an example of beams that the beamforming wireless device 1 can form. In this example, the beamforming wireless device 1 can form beams within a specified angular range. In the example depicted in FIG. 5, beams are formed within a range from −60° to 60°. The beamforming wireless device 1 may also form beams in a plurality of main lobe directions designated in advance. In the example depicted in FIG. 5, a plurality of main lobe directions are arranged at spacings of 10°. In particular, main lobe directions are established at −50°, −40°, −30°, . . . 50°. Identification numbers (ID1-IDn) are assigned to the beams formed in the main lobe directions. When the beamforming wireless device 1 performs polarization multiplexing communication, two beams can be formed in each of the main lobe directions.

Figure 6:
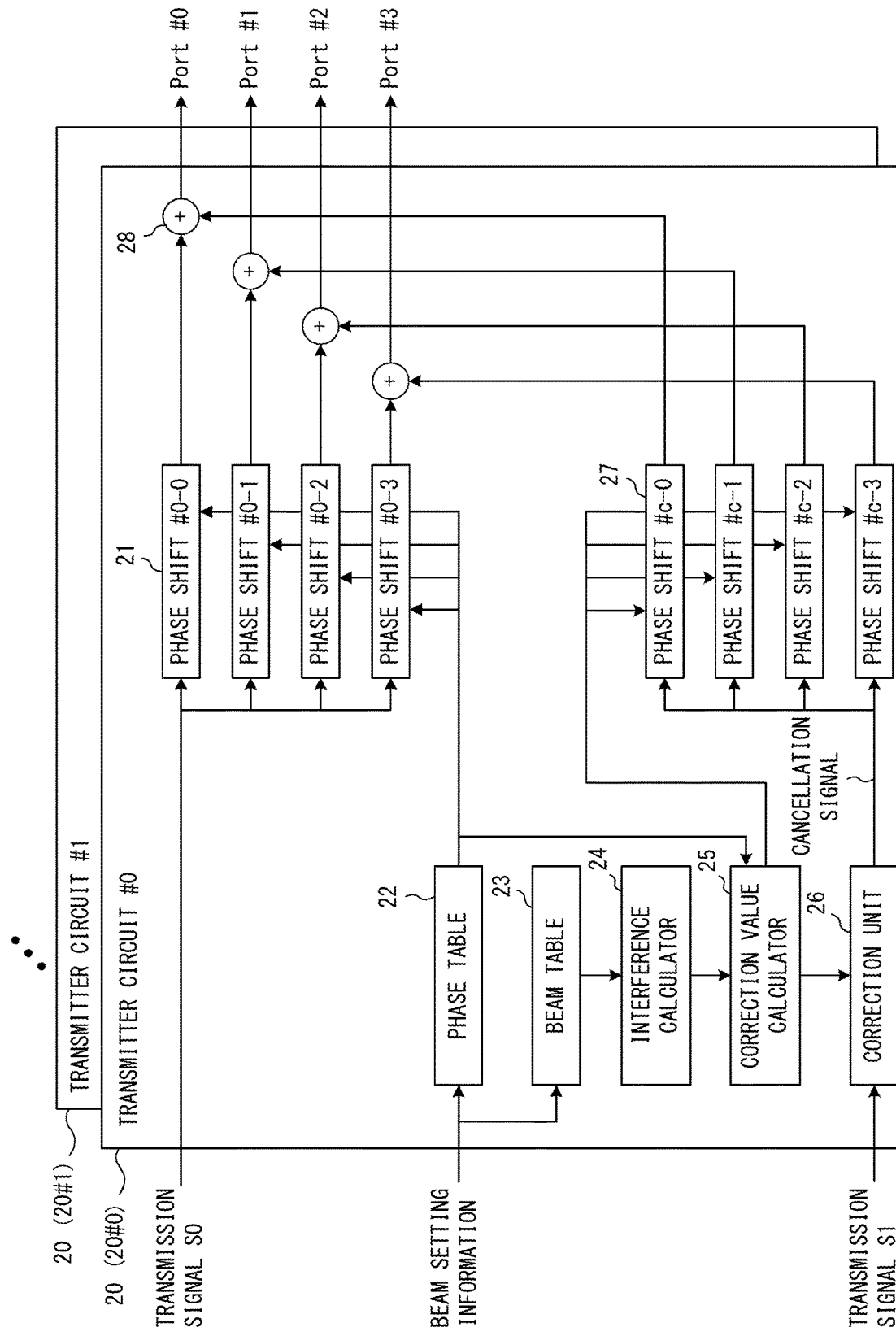
FIG. 6 illustrates an example of a transmitter circuit of a beamforming wireless device.

FIG. 6 illustrates an example of a transmitter circuit of the beamforming wireless device 1. A transmitter circuit 20 includes phase shifters 21 (#0-0 to #0-3), a phase table 22, a beam table 23, an interference calculator 24, a correction value calculator 25, a correction unit 26, phase shifters 27 (#c-0 to #c-3), and adders 28. The transmitter circuit 20 may include other elements or circuits that are not depicted in FIG. 6. In this example, the beamforming wireless device 1 includes four antenna elements. In addition, the beamforming wireless device 1 includes a transmitter circuit 20 for each transmission signal. Thus, when the beamforming wireless device 1 is configured to be capable of concurrently transmitting signals to n terminals, the beamforming wireless device 1 may include n transmitter circuits 20.

A signal to be transmitted by a transmitter circuit 20 is input to the transmitter circuit 20. In this example, a signal S0 is input to a transmitter circuit 20#0. A signal to be transmitted by another transmitter circuit is also input to the transmitter circuit 20. In this example, a signal S1 to be transmitted by a transmitter circuit 20#1 is input to the transmitter circuit 20#0. In FIG. 6, for ease of descriptions, only the signal S1 is input to the transmitter circuit 20#0 as a signal to be transmitted by another transmitter circuit. However, the transmitter circuit 20#0 will actually receive input of all signals to be transmitted by the other transmitter circuits.

Beam setting information is supplied to the transmitter circuit 20 from the host device. The beam setting information identifies a beam to be formed by the beamforming wireless device 1. The beam to be formed by the beamforming wireless device 1 is determined by the host device according to the position of a terminal that is a destination of a transmission signal.

Figure 7:
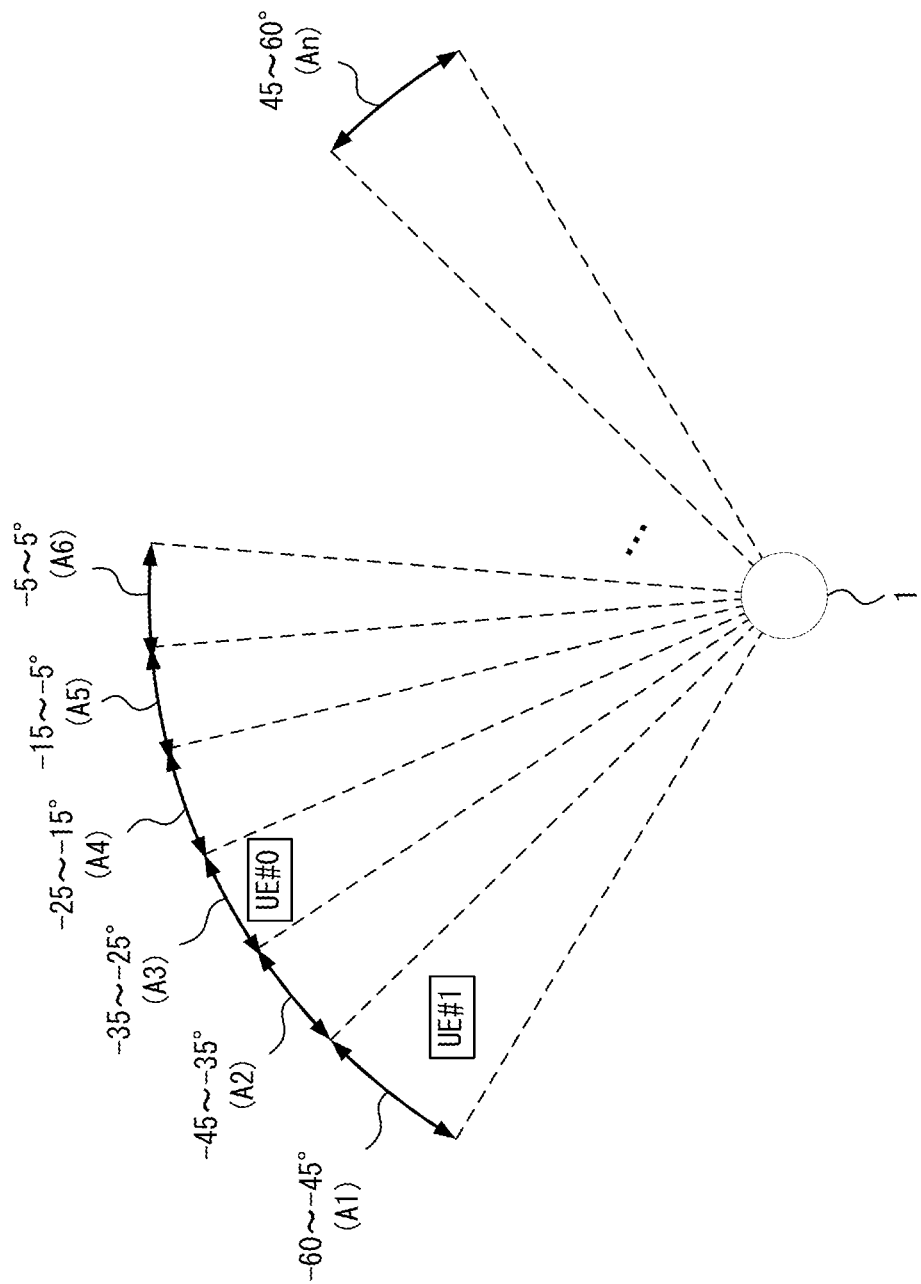
FIG. 7 illustrates an example of a method for allocating a beam to a transmission signal.

FIG. 7 illustrates an example of a method for allocating a beam to a transmission signal. In this example, the beamforming wireless device 1 can form the beams ID1-IDn depicted in FIG. 5. In this case, the angular range in which the beamforming wireless device 1 can form beams (−60° to 60°) is divided according to the beams ID1-IDn. In particular, one region is allocated to each beam. For example, a region A1 (−60° to −45°) may be allocated to the beam ID1, and a region A2 (−45° to −35°) may be allocated to the beam ID2.

The host device is aware of the positions of the terminals accommodated by the beamforming wireless device 1. That is, the host device is aware of which of the plurality of regions A1-An each of the terminals is located in. In this example, UE #0 is located in the region A3, and UE #1 is located in the region A1. In this case, according to the position of each of the terminals, the host device allocates a beam for communicating with the terminal. In this example, the beam ID3 is allocated to a signal S0 to be transmitted to UE #0, and the beam ID1 is allocated to a signal S1 to be transmitted to UE #1.

The host device generates beam setting information indicating the allocation of the beams and supplies the beam setting information to the beamforming wireless device 1. Accordingly, in the example depicted in FIG. 7, the following beam setting information is supplied to the beamforming wireless device 1.

Signal S0: beam ID3
Signal S1: beam ID1

Descriptions are given in the following by referring to FIG. 6 again. The transmission signal S0 input to the transmitter circuit 20 is guided to the phase shifters 21 (#0-0 to #0-3). The phase shifters 21 control the phase of the transmission signal S0 so as to form a beam for transmitting the transmission signal S0. The phase control is performed in accordance with the phase information stored in the phase table 22.

FIG. 8 illustrates an example of the phase table 22. For each of the beams (ID1, ID2, . . . ), the phase table 22 indicates the phases of signals to be output via the antennas. For example, phase information for forming the beam ID1 may indicate that "the phases of signals to be output via ports #0, #1, #2, and #3 are respectively set to $\theta\_01$, $\theta\_11$, $\theta\_21$, and $\theta\_31$."

In this example, the transmitter circuit 20 transmits the signal S0 by using the beam ID3. In this case, the information indicating that "the phases of signals to be output via ports #0, #1, #2, and #3 are respectively set to $\theta\_03$, $\theta\_13$, $\theta\_23$, and $\theta\_33$" is read from the phase table 22 and set for the phase shifters 21. Thus, the phase shifter 21#0-0 adjusts the phase of the signal S0 to $\theta\_03$, the phase shifter 21#0-1 adjusts the phase of the signal S0 to $\theta\_13$, the phase shifter 21#0-2 adjusts the phase of the signal S0 to θ_23, and the phase shifter 21#0-3 adjusts the phase of the signal S0 to θ_33.

Figure 9:
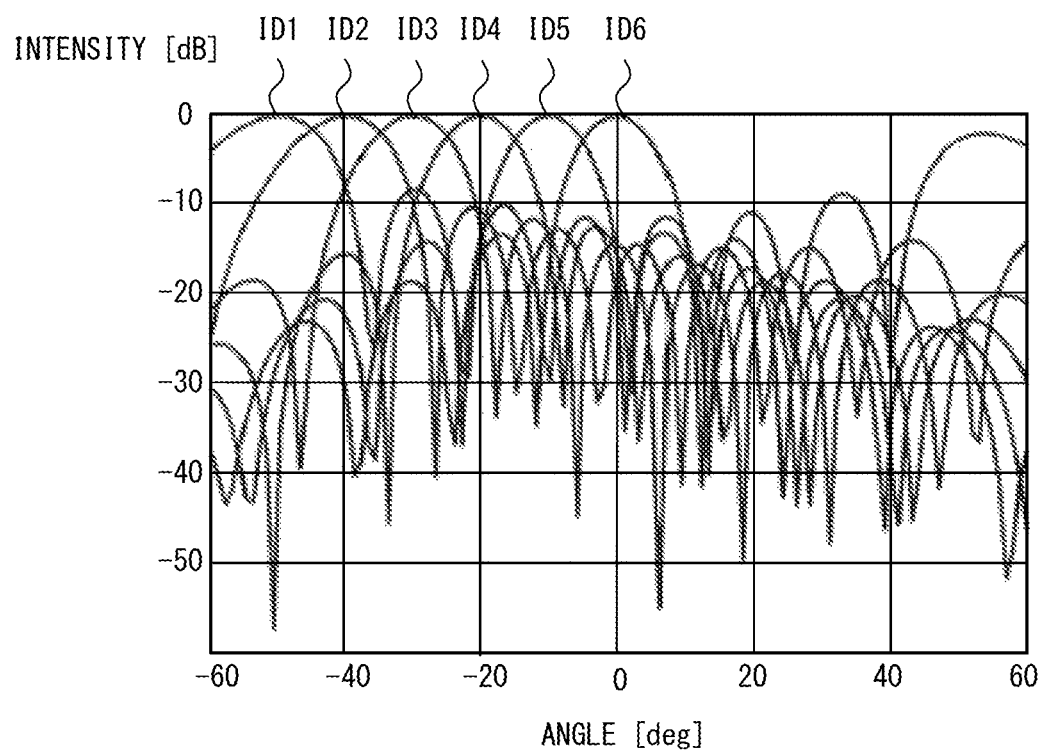
FIG. 9 illustrates an example of directivity information.

FIG. 9 illustrates an example of directivity information. The directivity information indicates the directivities of radio intensities of the beams formed in accordance with the phase information stored in the phase table 22. In this example, the directivities of the radio intensities of the beams ID1-ID6 are indicated. For example, the beam ID3 may have a main lobe in a direction of −30°. The directivity information may be obtained in advance through, for example, a simulation or measurement. The directivity information is stored in the beam table 23.

FIG. 10 illustrates an example of the directivity information stored in the beam table 23. As described above, the directivity information indicates the directivities of the radio intensities of beams. In particular, for each of the beams, the directivity information indicates the intensities of radio waves within a specified angular range. In this example, the beamforming wireless device 1 forms beams within the range from −60° to 60°. Thus, for each of the beams, the directivity information indicates the intensities of radio waves within the range from −60° to 60°. The beam table 23 records the intensities of radio waves with specified angular spacing. In the example depicted in FIG. 10, the intensities of radio waves are recorded with spacing of 5°. However, the intensities of radio waves may be recorded with smaller spacing.

When a plurality of beams are concurrently formed, the interference calculator 24 calculates the amount of interference between the plurality of beams according to the directivity information stored in the beam table 23. As described above, beams formed by the beamforming wireless device 1 are designated by the beam setting information. In this example, the transmitter circuit 20#0 depicted in FIG. 6 forms a beam ID3 to transmit a signal S0. Another transmitter circuit implemented in the beamforming wireless device 1 forms a beam ID1 for transmitting a signal S1.

In this case, the interference calculator 24 implemented in the transmitter circuit 20#0 calculates the amount of interference from the beam ID1 to the beam ID3. In particular, the calculation indicated below is performed. Note that in the description below, the beam ID3 for transmitting the signal S0 by the transmitter circuit 20#0 may be referred to as a "desired beam." The beam ID1 formed by the other transmitter circuit so as to transmit the signal S1 may hereinafter be referred to as an "interference beam."

The main lobe of the desired beam ID3 is formed within a range from −34° to −26°. Thus, the main lobe direction of the desired beam ID3 is −30°. Accordingly, the interference calculator 24 refers to the beam table 23 and obtains the radio intensity of the interference beam ID1 in the main lobe direction of the desired beam ID3. In this example, the radio intensity of the interference beam ID1 at −30° is −8.3 dB.

Figure 11:
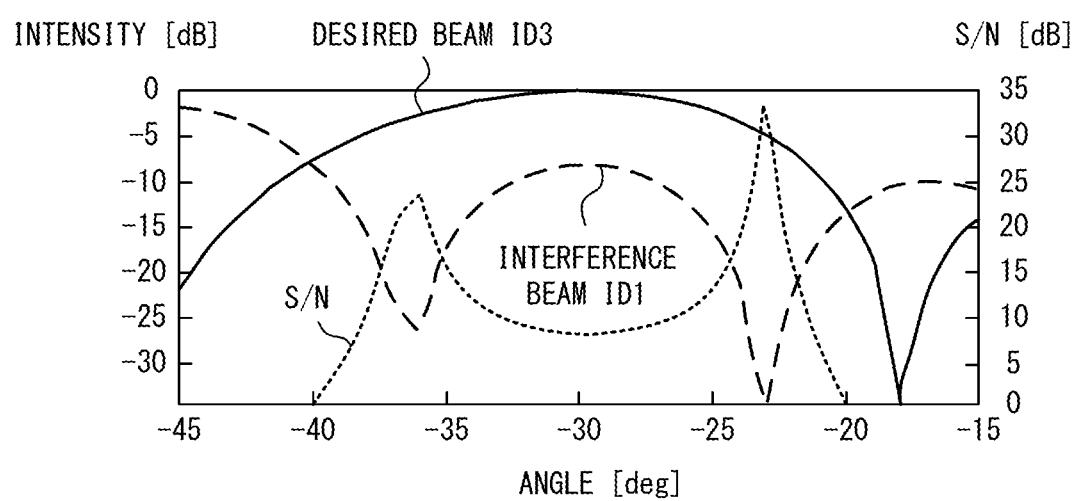
FIG. 11 illustrates an example of interference between a desired beam and an interference beam.

FIG. 11 illustrates an example of interference between a desired beam and an interference beam. As described above, the desired beam ID3 has a main lobe in a direction of −30°. In this example, the intensity of the desired beam ID3 in the main lobe direction is 0 dB. A side lobe of the interference beam ID1 emerges in the direction of −30°. As depicted in FIG. 10, the intensity of the interference beam ID1 in this direction is −8.3 dB. Thus, the signal-to-noise ratio (S/N) of the desired beam ID3 is 8.3 dB when the interference beam ID1 works as noise. A signal-to-noise ratio is one indicator of the amount of interference between beams.

The correction value calculator 25 decides whether the amount of interference from an interference beam to a desired beam is greater than a threshold. In this example, the signal-to-noise ratio of the desired beam with the interference beam as noise is compared with the threshold. For example, the threshold may be determined in advance according to quality required in a wireless network, although not particularly limited. In this example, the threshold is 10 dB. In this case, the signal-to-noise ratio of the desired beam ID3 is lower than the threshold, so it is decided that the amount of interference from the interference beam to the desired beam is greater than the threshold.

When the amount of interference from an interference beam to a desired beam is greater than the threshold, the correction value calculator 25 calculates a correction value for generating a cancellation signal. In this example, the correction value controls the intensity of radio waves. An example of a method for calculating the correction value is described hereinafter.

The correction unit 26 corrects an input signal by using the correction value calculated by the correction value calculator 25. The input signal corresponds to a signal to be transmitted via an interference beam. In this example, the signal input to the correction unit 26 is the signal S1 to be transmitted via the interference beam ID1. The correction unit 26 controls the amplitude of the signal S1 in accordance with the correction value. As a result, a cancellation signal for suppressing interference from the interference beam to the desired beam is generated.

The signal corrected by the correction unit 26 is (i.e., cancellation signal) is guided to the phase shifters 27 (#c-0 to #c-3). The configuration and operation of the phase shifters 27 (#c-0 to #c-3) are substantially the same as those of the phase shifters 21 (#0-0 to #0-3). Thus, the phase shifters 27 (#c-0 to #c-3) control the phase of the cancellation signal. In this case, the phase shifters 27 (#c-0 to #c-3) control the phase of the cancellation signal such that the cancellation signal is transmitted in a specified direction. In particular, the phase shifters 27 (#c-0 to #c-3) form a beam for transmitting the cancellation signal.

The correction value calculator 25, the correction unit 26, and the phase shifters 27 are operated as a cancellation signal generator for generating a cancellation signal. The cancellation signal is generated to cancel a signal transmitted via an interference beam in the main lobe direction of a desired beam. In this example, the signal S1 is transmitted via a side lobe of the interference beam ID1 in the main lobe direction of the desired beam ID3. In this case, the cancellation signal is generated to cancel the signal S1 transmitted via a side lobe of the interference beam ID1 in the main lobe direction of the desired beam ID3. As an example, the cancellation signal may be generated to satisfy the following conditions.

(1) The intensity of the beam for transmitting the cancellation signal is the same as the intensity of the interference beam ID1 in the main lobe direction of the desired beam ID3.

(2) The direction of the main lobe of the beam for transmitting the cancellation signal is the same as the direction of the desired beam ID3.

(3) Data carried by the cancellation signal is the same as data carried by the signal S1 transmitted via the interference beam ID1.

In this example, the intensity of the desired beam in the main lobe direction (i.e., −30°) is 0 dB. The intensity of the interference beam ID1 in the main lobe direction is −8.3 dB. Hence, the intensity of the cancellation signal needs to be lower than the signal S0 transmitted using the desired beam by −8.3 dB in order to satisfy the condition (1). Accordingly, the correction value calculator 25 outputs, as a correction value, the difference between the intensity of the desired beam ID3 in the main lobe direction and the intensity of the interference beam ID1 in the main lobe direction (i.e., 8.3 dB). In this case, the correction unit 26 corrects the amplitude of the signal S1 in accordance with the correction value such that the intensity of the signal S1 decreases by 8.3 dB. Furthermore, the correction unit 26 inverts the signal. As a result, a cancellation signal is generated.

In accordance with the condition (2), the cancellation signal is transmitted in the same direction as the direction of the desired beam ID3. Thus, the phase information supplied to the phase shifters 27 so as to control the transmission direction of the cancellation signal is the same as the phase information supplied to the phase shifters 21 so as to control the transmission direction of the signal S0. Thus, the phase information for forming the desired beam ID3 is supplied to the phase shifters 27. In accordance with the phase information, the phase shifters 27 (#c-0 to #c-3) control the phase of the cancellation signal output from the correction unit 26. The signal input to the correction unit 26 is the signal S1 transmitted via the interference beam ID1. Thus, the condition (3) is also satisfied.

The adders 28 add output signals of the phase shifters (#C-1 to #C-3) to output signals of the phase shifters 21 (#0-0 to #0-3), respectively. That is, the cancellation signal is added to the signal S0.

The output signals of the adders 28 are guided via the ports #0, #1, #2, and #3 to corresponding antennas. The beamforming wireless device 1 transmits the signal S0 and the cancellation signal via these antennas.

Figure 12:
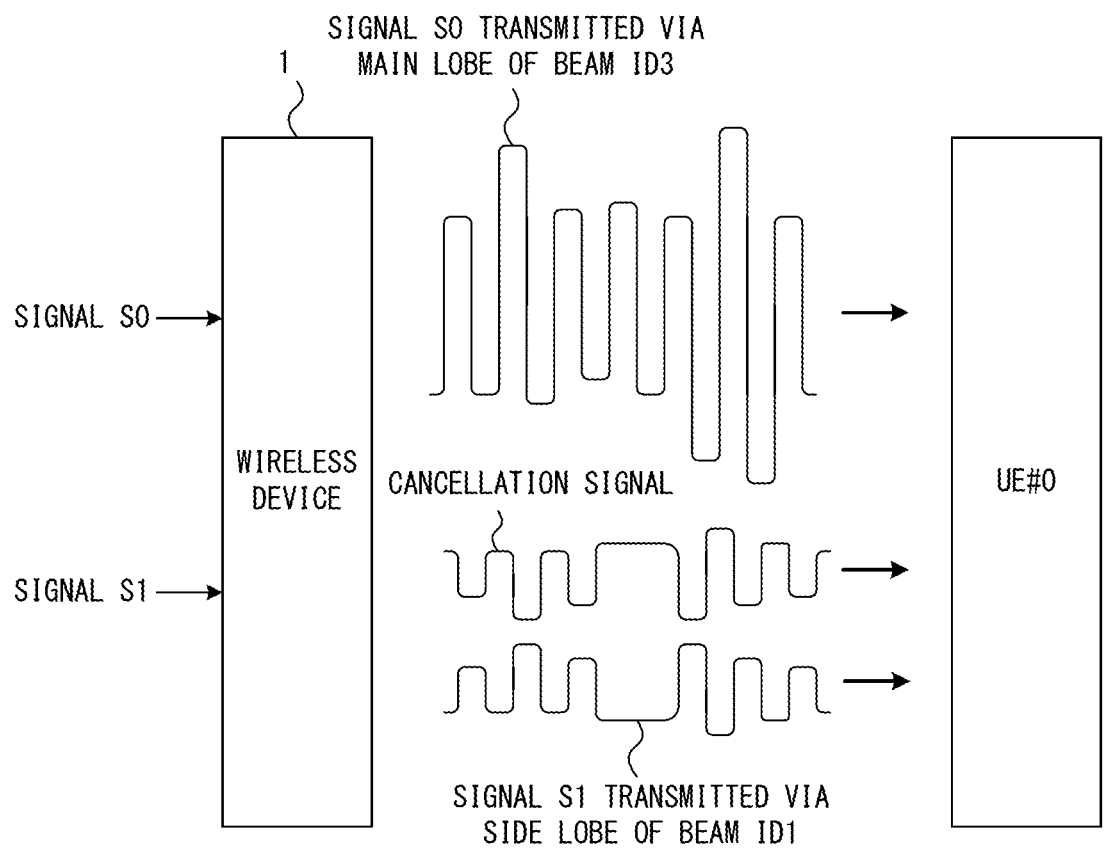
FIG. 12 illustrates an example of a transmission from a beamforming wireless device to a target terminal.

FIG. 12 illustrates an example of a transmission from the beamforming wireless device 1 to a target terminal. In this example, a signal S0 is transmitted from the beamforming wireless device 1 to UE #0 via the beam ID3. A signal S1 is transmitted from the beamforming wireless device 1 to another terminal (not illustrated) via the beam ID1. In this case, the signal S1 arrives at UE #0 via a side lobe of the beam ID1.

The beamforming wireless device 1 generates a cancellation signal for canceling the signal S1 that arrives at UE #0. The beamforming wireless device 1 transmits the signal S0 with the cancellation signal added to this signal (or a combined signal of the signal S0 and the cancellation signal). The cancellation signal is transmitted in the same direction as the direction of the beam ID3. Thus, the signal S0 and the cancellation signal are transmitted to UE #0 via the beam ID3. Accordingly, the signal S1 transmitted via a side lobe of the beam ID1 is canceled by the cancellation signal. Hence, the influence of the interference beam is suppressed for UE #0. Therefore, the quality of wireless communication is improved.

FIGS. 13A and 13B illustrate an example of the state of radio waves in a case where a cancellation signal is transmitted. Note that the desired beam ID3 and the interference beam ID1 in FIGS. 13A and 13B are the same as those in FIG. 11. Thus, the main lobe of the desired beam ID3 is formed in the direction of −30°. A side lobe of the interference beam ID1 also emerges in the direction of −30°.

As indicated in FIG. 13A, the beamforming wireless device 1 generates a cancellation beam for transmitting a cancellation signal so as to cancel the interference beam ID1. In this example, the cancellation signal is generated according to a signal to be transmitted via the interference beam ID1 (in the example described above, the signal S1). As an example, the cancellation signal may be generated by inverting the signal to be transmitted via the interference beam ID1. For example, the intensity of the cancellation beam may be controlled so as to be equal to the intensity of the interference beam ID1 in the main lobe direction of the desired beam ID3. The cancellation beam may be formed in the main lobe direction of the desired beam ID3. Alternatively, the cancellation beam may be formed in the direction in which a peak of the interference beam ID1 emerges.

Transmitting the cancellation signal via the cancellation beam causes the signal transmitted via the interference beam ID1 and the cancellation signal to cancel each other in a receiver terminal (in FIG. 12, UE #0). In this example, the cancellation beam is formed such that the intensities of the interference beam ID1 and the cancellation beam are equal in the main lobe direction of the desired beam ID3. Thus, the signal-to-noise ratio of the desired beam ID3 with the interference beam ID1 as noise is high in the main lobe direction of the desired beam ID3. In the example depicted in FIG. 13B, the main lobe of the desired beam ID3 is in the range of −26° to −34°. The worst value of the signal-to-noise ratio is about 11 dB within this main lobe range. Thus, by generating the cancellation beam, the communication quality can be improved in comparison with the case depicted in FIG. 11. In addition, the performance can be optimized at the center of the desired beam, so that a plurality of sets of beam information can be established to implement a communication system attaining a preferable signal-to-noise ratio over a wide range.

Note that the phase shifters 21 (#0-0 to #0-3), the interference calculator 24, the correction value calculator 25, the correction unit 26, the phase shifters 27 (#c-0 to #c-3), and the adders 28 may be implemented by the processor 13 depicted in FIGS. 3 and 4. In this case, the functions of the phase shifters (#0-0 to #0-3), the interference calculator 24, the correction value calculator 25, the correction unit 26, the phase shifters 27 (#c-0 to #c-3), and the adders 28 are provided by the processor 13 executing the communication program.

Figure 14:
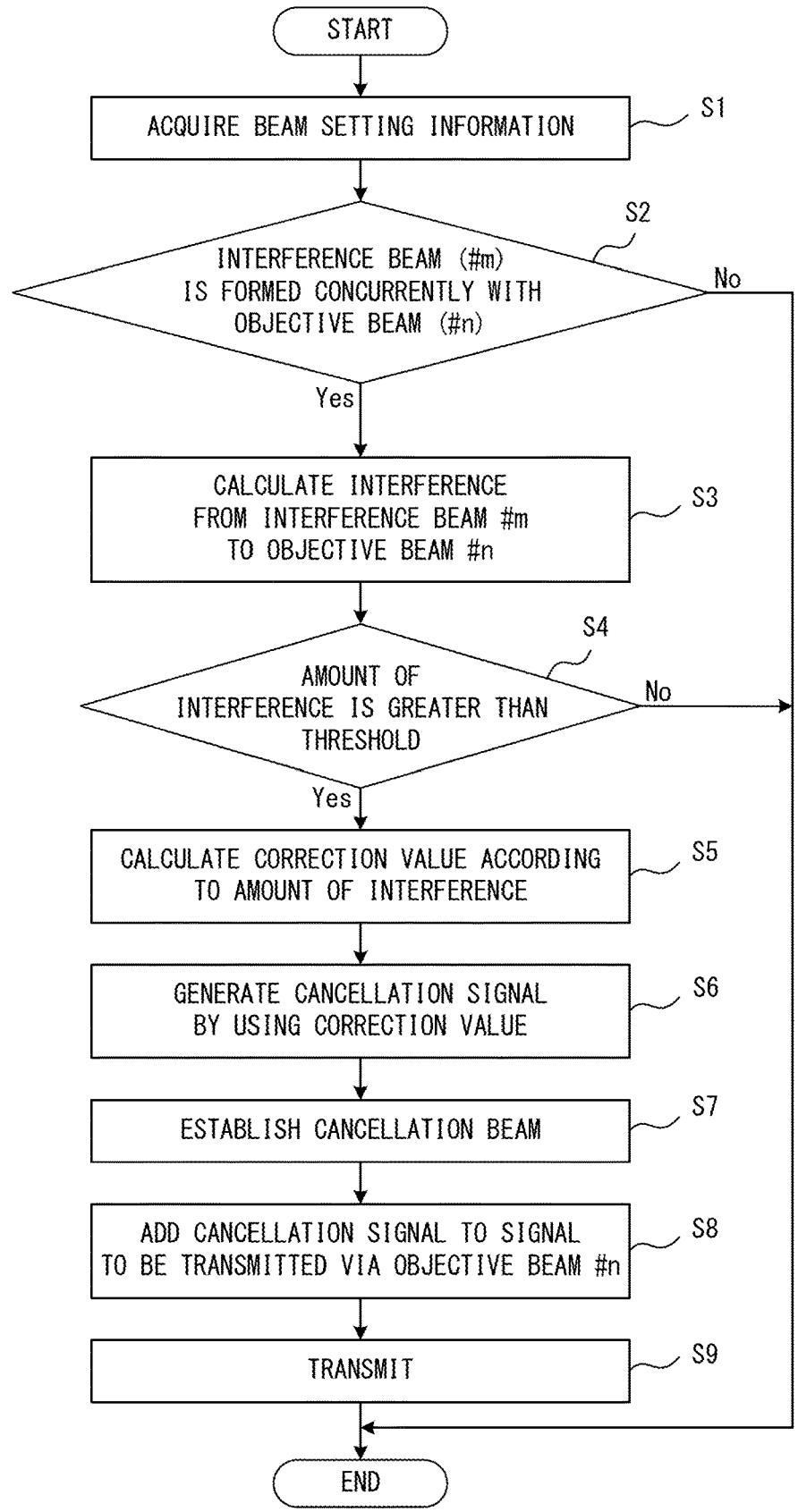
FIG. 14 is a flowchart illustrating an example of a transmission operation of a beamforming wireless device.

FIG. 14 is a flowchart illustrating an example of a transmission operation of the beamforming wireless device 1. The processes of this flowchart are performed for each of transmission beams formed by the transmitter circuits 20 of the beamforming wireless device 1. A transmission beam processed according to the flowchart depicted in FIG. 14 may hereinafter be referred to as an "objective beam."

In S1, the beamforming wireless device 1 acquires beam setting information generated by the host device. In this case, the host device allocates beams to terminals located in a communication area covered by the beamforming wireless device 1. The beam setting information indicates relations between beams formed by the beamforming wireless device 1 and terminals. Thus, the beam setting information indicates relations between the beams and signals transmitted to the terminals. In the examples depicted in FIGS. 5 and 7, the beam ID3 is allocated to the signal S0 to be transmitted to UE #0, and the beam ID1 is allocated to the signal S1 to be transmitted to UE #1.

In S2, the interference calculator 24 decides, according to the beam setting information, whether there is a beam #m to be formed concurrently with an objective beam #n. Note that a beam formed concurrently with an objective beam may hereinafter be referred to as an "interference beam." When there is an interference beam #m, the interference calculator 24 calculates, in S3, the amount of interference from the interference beam #m to the objective beam #n by referring to the directivity information stored in the beam table 23. For example, the amount of interference may be expressed by a signal-to-noise ratio. In this case, the interference calculator 24 calculates the ratio between the intensity of the objective beam #n and the intensity of the interference beam #m for the main lobe direction of the beam objective #n.

In S4, the correction value calculation unit 25 decides whether the amount of interference calculated by the interference calculator 24 is greater than a threshold. For example, the threshold may be determined in advance according to quality required in the wireless network. When the amount of interference is greater than the threshold, the correction value calculator 25 calculates, in S5, a correction value designating the intensity of a cancellation beam. In a case where the amount of interference is expressed by a signal-to-noise ratio, a correction value is calculated when the signal-to-noise ratio is less than the threshold. For example, the correction value may be determined such that the intensity of the cancellation beam and the intensity of the interference beam #m are equal in the main lobe direction of the objective beam #n. The correction value calculator 25 also generates phase information designating a direction in which the cancellation beam is to be formed, and supplies the generated phase information to the phase shifters 27. For example, the cancellation beam may be formed in the same direction as the objective beam #m. In this case, the phase information supplied to the phase shifters 27 may be the same as the phase information supplied to the phase shifters 21.

In S6, the correction unit 26 corrects the signal to be transmitted via the interference beam #m by using the correction value calculated by the correction value calculator 25. In this case, the correction unit 26 inverts the signal to be transmitted via the interference beam #m and corrects the amplitude of the signal in accordance with the correction value. In the example illustrated in FIG. 6, the correction unit 26 inverts the signal S1 and corrects the amplitude of the inverted signal in accordance with the correction value. As a result, a cancellation signal is generated.

In S7, the phase shifters 27 establish a cancellation beam for transmitting the cancellation signal. The cancellation beam is established by the phase shifters 27 controlling the phase of the cancellation signal. As an example, each of the phase shifters 27 (#c-0 to #c-3) may control the phase of the cancellation signal such that the main lobe of the cancellation beam is formed in the main lobe direction of the objective beam #m.

In S8, for the individual ports (i.e., for the individual antenna elements), the adders 28 add the cancellation signal to the signal to be transmitted via the objective beam #m. In the example depicted in FIG. 6, output signals of the phase shifters #c-0 to #c-3 are respectively added to output signals of the phase shifters #0-0 to #0-3.

In S9, output signals of the adders 28 are transmitted via corresponding antenna elements. The output signals include the cancellation signal. Thus, the cancellation beam is formed in addition to the objective beam #m. Note that a digital-to-analog converter, an amplifier, and the like are implemented between the adders 28 and the antenna elements.

As described above, the beamforming wireless device 1 forms a cancellation beam for canceling an interference beam. In this regard, the beamforming wireless device 1 uses directivity information prepared in advance so as to calculate the angle and intensity of an interference beam that could interfere with a desired beam, and forms a cancellation beam based on a result of the calculation. The beamforming wireless device 1 suppresses the influence of the interference beam by combining the desired beam with the cancellation beam. Hence, the beamforming wireless device 1 does not need to measure the radio wave condition when forming a cancellation beam, and thus can appropriately suppress a side lobe of an interference beam even in the case of a wireless communication system in which a transmission beam needs to be changed at a fast rate. Accordingly, even in the case of a wireless communication system in which a transmission beam needs to be changed on a symbol-by-symbol basis, interference caused by a side lobe of an interference beam can be appropriately suppressed, thereby enhancing communication quality.

In the examples described above, one interference beam is generated for a desired beam. However, a plurality of interference beams may be generated for a desired beam. In this case, the beamforming wireless device 1 may form a corresponding cancellation beam for each of the interference beams.

Reception Beam

As described above, the beamforming wireless device 1 transmits/receives signals to/from terminals 100. When receiving signals transmitted from the terminals 100, the beamforming wireless device 1 forms a reception beam for each of the terminals 100.

Figure 15:
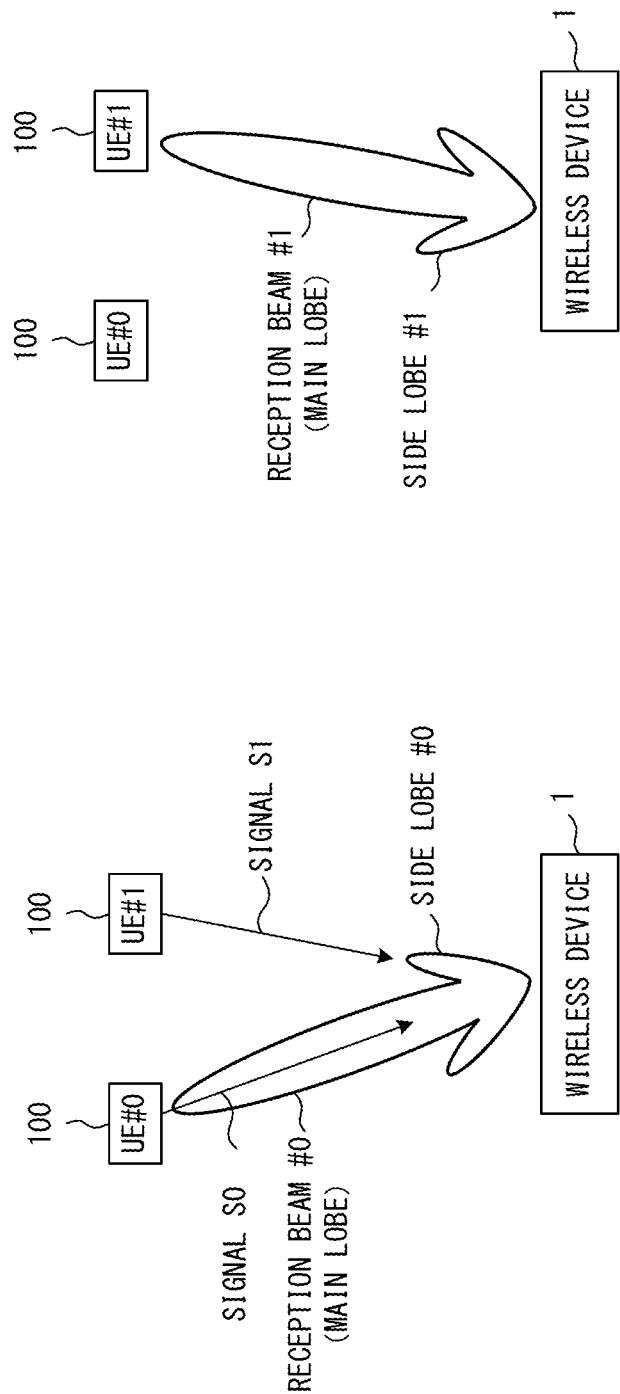
FIGS. 15A and 15B illustrate an example of interference between reception beams.

FIGS. 15A and 15B illustrate an example of interference between reception beams. In this example, the wireless communication system includes the beamforming wireless device 1 and the plurality of terminals (UE #0 and UE #1), as in FIGS. 1A-1C.

When receiving a signal S0 transmitted from UE #0, the beamforming wireless device 1 forms a reception beam #0, as depicted in FIG. 15A. The main lobe of the reception beam #0 is formed in a direction toward UE #0. However, forming the reception beam #0 causes a corresponding side lobe #0 to emerge. In this example, the side lobe #0 emerges in a direction toward UE #1. In this case, if UE #1 transmits the signal S1, the beamforming wireless device 1 will receive the signal S1 via the side lobe #0. As a result, the quality of the signal S0 will be reduced.

However, when UE #1 transmits the signal S1, the beamforming wireless device 1 forms a reception beam #1 for UE #1, as depicted in FIG. 15B. Thus, by referring to the directivity information described above (e.g., the beam table 23 depicted in FIG. 10), the beamforming wireless device 1 can estimate the intensity of the signal S1 to be received via the side lobe #0. In this example, the signal S1 received via the side lobe #0 corresponds to an interference component for the signal S0. Thus, the beamforming wireless device 1 can extract the signal S0 by removing the interference component (i.e., the signal S1 received via the side lobe #0) from the signal received via the reception beam #0.

Figure 16:
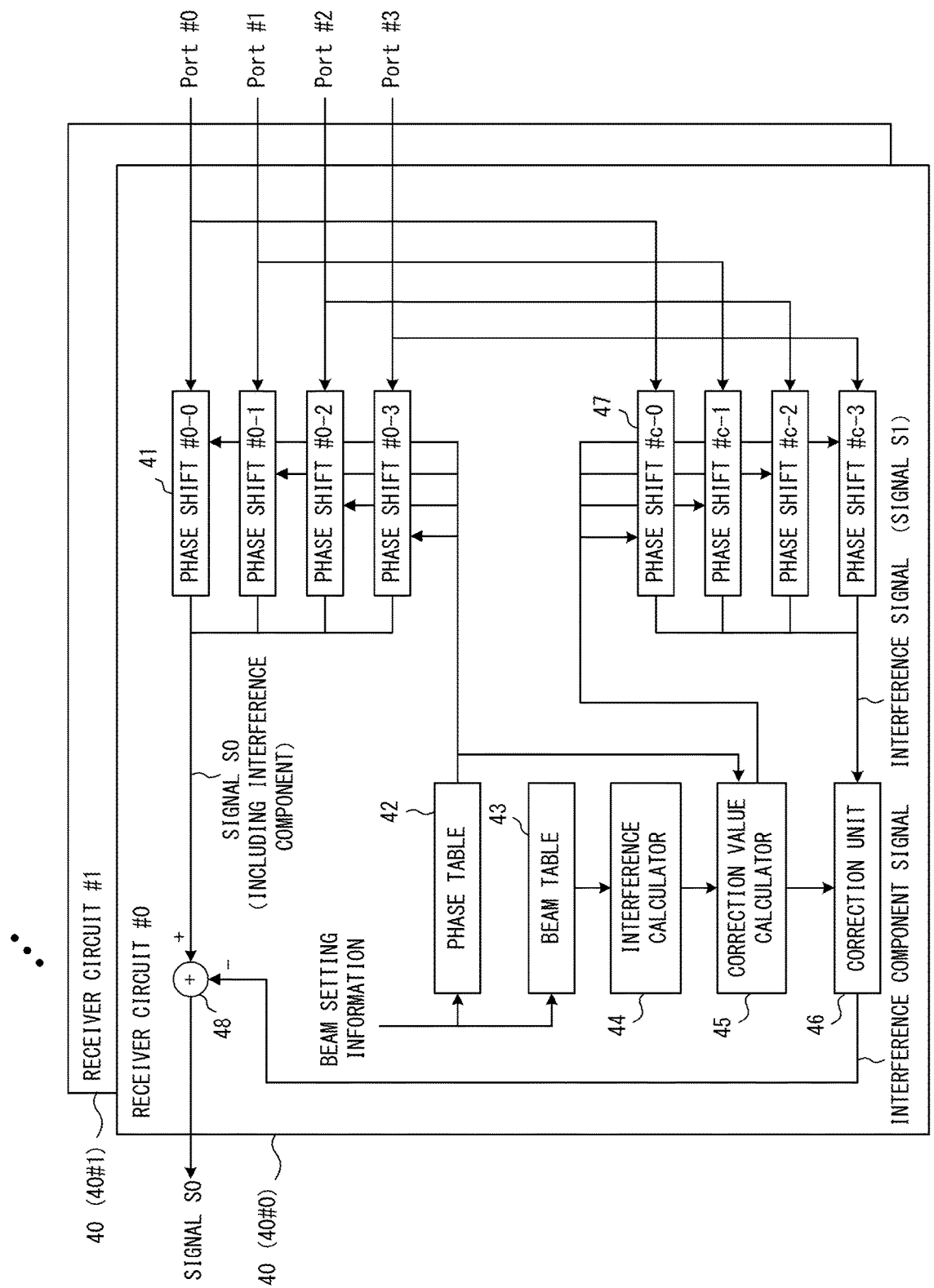
FIG. 16 illustrates an example of a receiver circuit of a beamforming wireless device.

FIG. 16 illustrates an example of a receiver circuit of the beamforming wireless device 1. A receiver circuit 40 includes phase shifters 41 (#0-0 to #0-3), a phase table 42, a beam table 43, an interference calculator 44, a correction value calculator 45, a correction unit 46, phase shifters 47 (#c-0 to #c-3), and a calculator 48. The receiver circuit 40 may include other elements or circuits that are not depicted in FIG. 16. The beamforming wireless device 1 includes four antenna elements. In addition, the beamforming wireless device 1 includes a receiver circuit 40 for each of signals to be received. Thus, when the beamforming wireless device 1 is configured to be capable of concurrently receiving signals from n terminals, the beamforming wireless device 1 may include n receiver circuits 40.

The phase shifters 41 (#0-0 to #0-3), the phase table 42, the beam table 43, the interference calculator 44, the correction value calculator 45, the correction unit 46, and the phase shifters 47 (#c-0 to #c-3) respectively correspond to the phase shifters 21 (#0-0 to #0-3), the phase table 22, the beam table 23, the interference calculator 24, the correction value calculator 25, the correction unit 26, and the phase shifters 27 (#c-0 to #c-3) depicted in FIG. 6.

The phase shifters 41 (#0-0 to #0-3) control the phase of signals received via corresponding antenna elements. In this case, the phase of each received signal is controlled such that a reception beam is formed in a direction in which a signal to be received by the receiver circuit 40 (i.e., target signal) comes. In this way, a desired reception beam is formed.

Output signals of the phase shifters 41 (#0-0 to #0-3) are combined. As a result, a signal received using a desired reception beam is acquired. However, the received signal includes not only a target signal but also an interference component. In the example depicted in FIG. 15A, the signal received using the reception beam #0 includes the signal S0 received via the main lobe and the signal S1 received via a side lobe. In this case, the signal S0 is the target signal, and the signal S1 is the interference component.

To estimate an interference component for a target signal, the receiver circuit 40 forms a reception beam for receiving another signal different from the target signal (the reception beam is hereinafter referred to as an "interference-signal reception beam," and the other signal is hereinafter referred to as an "interference signal"). The interference-signal reception beam is formed by the phase shifters 47.

The phase shifters 47 (#c-0 to #c-3) control the phases of signals received via corresponding antenna elements. Here, the phase shifters 47 control the phases of the received signals so as to form an interference-signal reception beam. In the examples depicted in FIGS. 15A and 15B, the phase shifters 47 form the reception beam #1. Output signals of the phase shifters 47 (#c-0 to #c-3) are combined. As a result, an interference signal is obtained.

By referring to the directivity information stored in the beam table 43, the interference calculator 44 calculates the amount of interference between the signal S0 received via the main lobe of the desired reception beam and the signal S1 received via a side lobe of the desired reception beam. The correction value calculator 45 generates a correction value based on the amount of correction.

Assume, for example, that the directivity information depicted in FIG. 10 is stored in the beam table 43. A receiver circuit 40 receives the signal S0 by using the beam ID3. Another receiver circuit of the beamforming wireless device 1 receives the signal S1 by using the beam ID2. In this case, the direction of the main lobe of the beam ID2 is −40°. In addition, the intensity of the beam ID3 in the direction of −40° is −7.6 dB. Accordingly, the intensity of the interference signal to be received by the receiver circuit 40 via the beam ID3 (i.e., signal S1) is estimated to be −7.6 dB. The correction value calculator 45 generates a correction value based on the intensity of the interference signal.

By using the correction value, the correction unit 46 corrects the amplitude of the interference signal acquired by the phase shifters 47. The interference signal for which the amplitude has been corrected corresponds to an interference component included in the signal received by the receiver circuit 40 using the desired reception beam. In the example depicted in FIG. 15A, the interference component signal acquired by the correction unit 46 corresponds to the signal S1 received via the side lobe #0. In this way, the correction value calculator 45, the correction unit 46, and the phase shifters 47 are operated as an interference component signal generator that generates an interference component signal.

The calculator 48 subtracts an output signal of the correction unit 46 (i.e., interference component signal) from a received signal. As a result, the interference component is removed from the signal received via the desired reception beam. In the example depicted in FIGS. 15A and 15B, the signal S0 is obtained by removing the signal S1 received via the side lobe #0 from the signal received using the reception beam #0.

Note that the phase shifters 41 (#0-0 to #0-3), the interference calculator 44, the correction value calculator 45, the correction unit 46, the phase shifters 47 (#c-0 to #c-3), and the calculator 48 may be implemented by the processor 13 depicted in FIGS. 3 and 4. In this case, the functions of the phase shifters (#0-0 to #0-3), the interference calculator 44, the correction value calculator 45, the correction unit 46, the phase shifters 47 (#c-0 to #c-3), and the calculator 48 are provided by the processor 13 executing the communication program.

Figure 17:
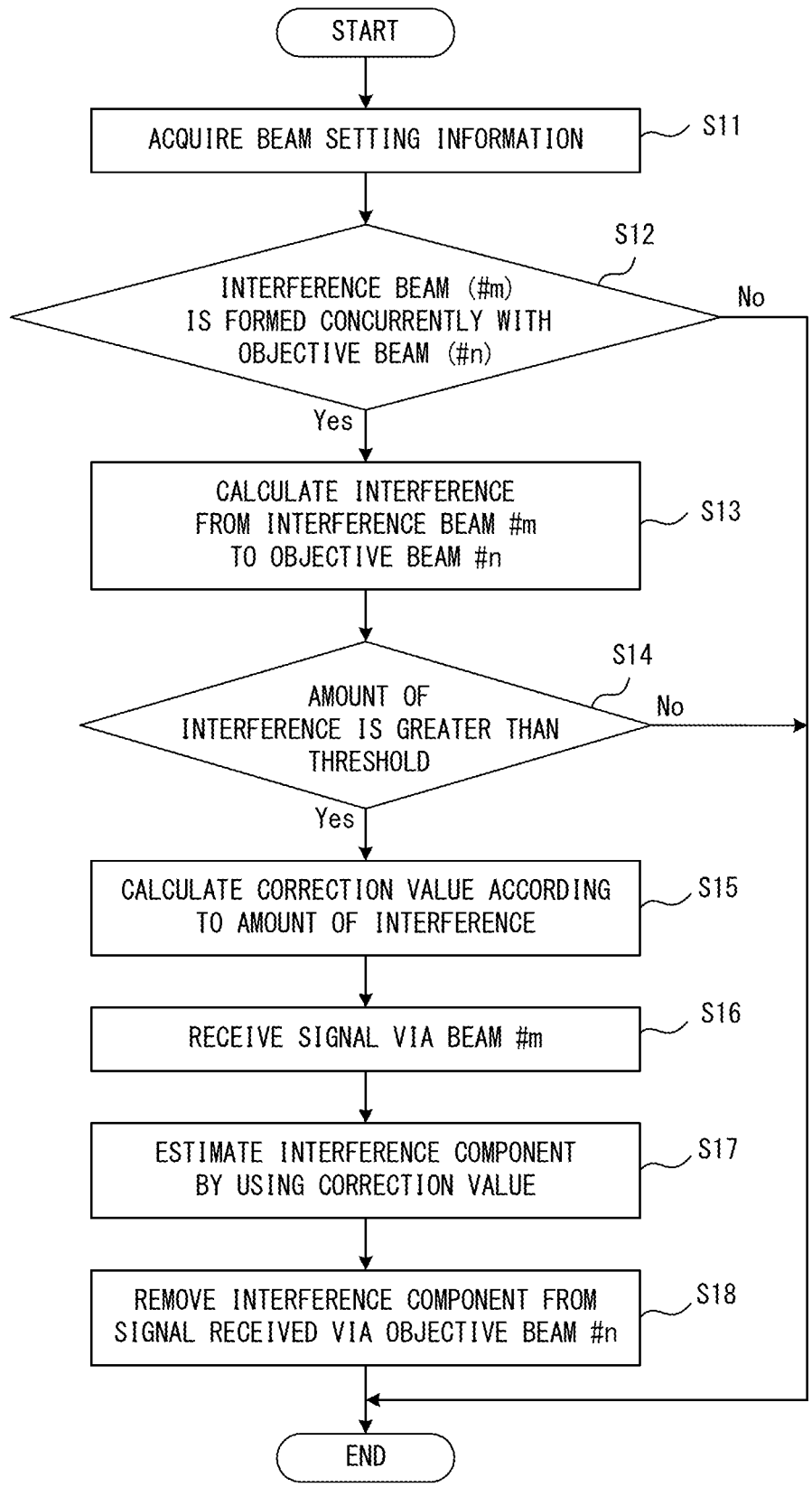
FIG. 17 is a flowchart illustrating an example of a reception operation of a beamforming wireless device.

FIG. 17 is a flowchart illustrating an example of a reception operation of the beamforming wireless device 1. The processes of this flowchart are performed for each of reception beams formed by the receiver circuits 40 of the beamforming wireless device 1. A reception beam processed according to the flowchart depicted in FIG. 17 may hereinafter be referred to as a "objective reception beam."

The processes of S11-S15 are substantially the same as S1-S5 depicted in FIG. 14. Thus, the beamforming wireless device 1 decides whether the amount of interference from another signal to a signal to be received by the reception objective beam is greater than a threshold. When the amount of interference is greater than the threshold, the beamforming wireless device 1 calculates a correction value.

In S16, the beamforming wireless device 1 forms interference reception beam #m according to beam setting information and the phase table 42. The interference reception beam #m is formed by setting, for the phase shifters 47 (#c-0 to #c-3), phase information obtained from the phase table 42 by using a beam ID designated by the beam setting information. The beamforming wireless device 1 detects an interference signal by receiving a signal via the interference reception beam #m.

In S17, the correction unit 46 corrects the amplitude of the interference signal by using the correction value obtained in S15, so as to estimate the interference component included in the signal received via the objective reception beam #n. In S18, the interference component is removed from the signal received via the objective reception beam #n. As a result, an objective signal is acquired.

As described above, the beamforming wireless device 1 has the function for removing an interference component received via a side lobe of a reception beam. In this regard, the beamforming wireless device 1 uses directivity information prepared in advance so as to calculate the angle and intensity of a signal that could interfere with a desired beam, and estimates the interference component according to a result of the calculation. The beamforming wireless device 1 suppresses the influence of the interference signal by removing the interference component from the received signal. Hence, the beamforming wireless device 1 does not need to measure the radio wave condition when estimating an interference component, and thus can appropriately suppress an interference component even in the case of a wireless communication system in which a reception beam needs to be changed at a fast rate. Accordingly, even in the case of a wireless communication system in which a reception beam needs to be changed on a symbol-by-symbol basis, an interference component can be appropriately suppressed, thereby enhancing communication quality.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A wireless communication device that implements beamforming, the wireless communication device comprising:
　a storage configured to store directivity information that indicates a directivity of a radio intensity obtained when beams are formed in a plurality of main lobe directions designated in advance; and
　a processor configured to
　　calculate, based on the directivity information, an interference to a first signal from a second signal when an instruction to form a first beam in a first main lobe direction and form a second beam in a second main lobe direction is given, the first beam being for receiving the first signal, the second beam being for receiving the second signal, and
　　generate, from a signal received using the second beam and based on the interference, an interference component signal indicating the second signal received via the first beam, and
　　remove the interference component signal from a signal received using the first beam, wherein
　in a process to generate the interference component signal, the processor calculates a correction value according to the interference,
　　controls a phase of a received signal so as to receive the signal that comes in the second main lobe direction, and
　　corrects, by using the correction value, an amplitude of the received signal whose phase having been controlled so as to generate the interference component signal.

2. The wireless communication device according to claim 1, wherein
　the processor calculates the interference based on a radio intensity of the first beam in the first main lobe direction and a radio intensity of the first beam in the second main lobe direction.

3. The wireless communication device according to claim 1, wherein
　the correction value is determined such that an intensity of the interference component signal is equal to an intensity of the second signal received via the first beam.

* * * * *